United States Patent
Hanley et al.

(10) Patent No.: US 7,720,511 B1
(45) Date of Patent: May 18, 2010

(54) SELF-OPTIMIZING ADAPTIVE ANTENNA

(75) Inventors: Brian Hanley, Bethesda, MD (US); Choong K Oh, Burke, VA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 576 days.

(21) Appl. No.: 11/748,630

(22) Filed: May 15, 2007

Related U.S. Application Data

(60) Provisional application No. 60/869,798, filed on Dec. 13, 2006.

(51) Int. Cl.
| | |
|---|---|
| *H04M 1/00* | (2006.01) |
| *H01Q 11/12* | (2006.01) |
| *H04B 1/04* | (2006.01) |
| *H04B 7/14* | (2006.01) |
| *G01S 5/02* | (2006.01) |
| *H01Q 1/32* | (2006.01) |
| *H01Q 3/00* | (2006.01) |
| *H10Q 13/00* | (2006.01) |

(52) U.S. Cl. ............... 455/562.1; 455/25; 455/63.4; 455/123; 455/125; 455/575.7; 342/422; 342/426; 343/700 ZR; 343/714; 343/723; 343/757; 343/777

(58) Field of Classification Search ............ 455/25, 455/63.4, 123, 125, 562.1, 575.7; 342/422, 342/426; 343/700 R, 714, 723, 757, 777
See application file for complete search history.

(56) References Cited

U.S. PATENT DOCUMENTS

| | | | | |
|---|---|---|---|---|
| 3,790,941 | A * | 2/1974 | Chivers et al. | 342/365 |
| 4,387,378 | A * | 6/1983 | Henderson | 342/374 |
| 5,752,204 | A * | 5/1998 | Epperson et al. | 455/575.7 |
| 5,774,690 | A | 6/1998 | O'Neill | |
| 6,056,780 | A * | 5/2000 | Aubry et al. | 703/2 |
| 6,380,748 | B1 * | 4/2002 | Kang et al. | 324/645 |
| 7,133,810 | B2 * | 11/2006 | Butler et al. | 703/2 |
| 2005/0042989 | A1 * | 2/2005 | Ho | 455/78 |
| 2006/0166681 | A1 * | 7/2006 | Lohbihler | 455/456.2 |

* cited by examiner

*Primary Examiner*—Ramesh B Patel
(74) *Attorney, Agent, or Firm*—Amy Ressing; Suresh Koshy

(57) ABSTRACT

The present invention determines optimal positions of a variable antenna using an artificial intelligence-based genetic algorithm (GA). The GA acquires a fitness value for an individual of a genetic algorithm population by updating positions of the antenna. The population improves through an evolutionary computational process using a fitness measure based on the signal strength. At the end of the process, the system positions the antenna to the best position found by the GA. Therefore, the final position gives exceptionally clear reception for a chosen received frequency.

11 Claims, 4 Drawing Sheets

FIG. 4

|  | $\varphi_1$ | $\theta_1$ | $\varphi_2$ | $\theta_2$ | $\omega$ |  | FF |
|---|---|---|---|---|---|---|---|
| Genome 1 | $\pi$ | 0 | $\pi/2$ | $\pi/4$ | $4\pi/3$ |  | .36 |
| Genome 2 | 0 | $2\pi/3$ | $3\pi/4$ | 0 | $\pi$ |  | .15 |
| Genome 3 | $3\pi/4$ | $4\pi/3$ | $3\pi/2$ | $2\pi/3$ | $3\pi/2$ |  | .47 |
| Genome 4 | $\pi/2$ | $\pi$ | 0 | $7\pi/4$ | $\pi/2$ |  | .80 |
| Genome 5 | $2\pi/3$ | $3\pi/2$ | $\pi/4$ | $3\pi/4$ | $\pi/4$ |  | .75 |
| Genome 6 | $\pi/4$ | $\pi/2$ | $4\pi/3$ | $3\pi/2$ | $3\pi/4$ |  | .61 |
| Genome 7 | $4\pi/3$ | $7\pi/4$ | $\pi$ | $\pi/2$ | 0 |  | .27 |
| Genome 8 | $3\pi/2$ | $\pi/4$ | $7\pi/4$ | $4\pi/3$ | $2\pi/3$ |  | .51 |
| Genome 9 | $7\pi/4$ | $3\pi/4$ | $2\pi/3$ | $\pi$ | $7\pi 4$ |  | .72 |
| Genome 10 | $5\pi/3$ | $3\pi/4$ | $\pi$ | $5\pi/3$ | $\pi/2$ |  | .81 |
| Genome 11 | $\pi/2$ | $\pi/4$ | $5\pi/3$ | $\pi$ | $3\pi/4$ |  | .67 |
| Genome 12 | $3\pi/4$ | $5\pi/3$ | $\pi/2$ | $\pi/2$ | $\pi$ |  | .33 |

FIG. 5

|  | $\varphi_1$ | $\theta_1$ | $\varphi_2$ | $\theta_2$ | $\omega$ |  | FF |
|---|---|---|---|---|---|---|---|
| Genome 4 | $\pi/2$ | $\pi$ | 0 | $7\pi/4$ | $\pi/2$ |  | .80 |
| Genome 4.2 | $\pi/2$ | $\pi$ | $\pi/4$ | $7\pi/4$ | $\pi/2$ |  | .89 |
| Genome 4.3 | $2\pi/3$ | $3\pi/2$ | 0 | $7\pi/4$ | $\pi/2$ |  | .60 |
| Genome 5 | $2\pi/3$ | $3\pi/2$ | $\pi/4$ | $3\pi/4$ | $\pi/4$ |  | .75 |
| Genome 5.2 | $2\pi/3$ | $3\pi/2$ | $\pi/4$ | $3\pi/4$ | $3\pi/4$ |  | .23 |
| Genome 5.3 | $\pi/2$ | $\pi$ | $\pi/4$ | $3\pi/4$ | $\pi/4$ |  | .51 |
| Genome 9 | $7\pi/4$ | $3\pi/4$ | $2\pi/3$ | $\pi$ | $7\pi 4$ |  | .72 |
| Genome 9.2 | $3\pi/2$ | $3\pi/4$ | $2\pi/3$ | $\pi$ | $7\pi 4$ |  | .78 |
| Genome 9.3 | $5\pi/3$ | $3\pi/4$ | $2\pi/3$ | $\pi$ | $7\pi 4$ |  | .70 |
| Genome 10 | $5\pi/3$ | $3\pi/4$ | $\pi$ | $5\pi/3$ | $\pi/2$ |  | .81 |
| Genome 10.2 | $5\pi/3$ | $3\pi/4$ | 0 | $5\pi/3$ | $\pi/2$ |  | .93 |
| Genome 10.3 | $7\pi/4$ | $3\pi/4$ | $\pi$ | $5\pi/3$ | $\pi/2$ |  | .84 |

US 7,720,511 B1

SELF-OPTIMIZING ADAPTIVE ANTENNA

CROSS-REFERENCE TO RELATED APPLICATIONS

This application claims the benefit of priority under 35 U.S.C. §119(e) to provisional patent application Ser. No. 60/869,798, filed Dec. 13, 2006, the entire disclosure of which is incorporated herein.

BACKGROUND OF THE INVENTION

When communicating between electronic devices without wires, antennas are used to transmit information between the electronic devices. On the both ends, the antennas are designed to improve the signal strength. Optimizing antenna element properties such as signal phase, signal amplification, and element position minimize the loss of energy when transmitting and thus reduces the amount of power required to transmit the signal and improves the quality of the signal sent. Optimizing such properties for a receiving antenna yields similar results.

Most antennas are designed in ideal laboratory conditions before they are connected to real devices. However, real operating conditions can deviate far from ideal conditions due to the environmental noise, system noise, severe weather conditions, interference with other signals, and terrain. In these unpredictable situations, the antenna does not fulfill its design goal and exhibits significantly degraded performance. One solution to these problems is the use of variable antennas. Conventional styles of variable antennas include directional antennas on rotating mounts and "rabbit ear" television antennas. The position of the variable antenna elements can be changed to adapt to changing signal conditions by either manual adjustment or a motor. Variable antennas generally require many adjustments to find a suitable antenna position to attain acceptable signal reception. Finding the best position of directional antennas on rotating mounts is easy because one would need to rotate the antenna only once around the axis and then pick the best position. However, "rabbit ear" style antennas which have two telescoping elements that can rotate through two different axes are much more complex because such antennas cannot test all possible lengths and angular positions of two elements in a reasonable amount of time. The final antenna positions are unlikely to be optimal because of the vast number of possible positions that such an antenna with two elements can take. Antennas could certainly be built with more elements than "rabbit car" style antennas, such as antennas created by connecting multiple telescoping and rotating elements. In this case, it would be impossible to obtain optimized positions of all elements because of the extraordinary number of possible combinations of element positions.

Although "rabbit ear" style antennas can be used to receive television signals, better reception can be achieved with outdoor antennas mounted on the outside or roof of a household. These antennas are usually large dipole, multiple elements Uda-Yagi, or multiple element bay antennas. All of these antennas have antenna elements that are fixed to a singular frame. Therefore, the angular positions and length of the antenna elements cannot be adjusted. The most movement any of these antennas can have is rotating around their mount point on a roof. While these antennas work well in most situations, their capabilities are limited, to some degree, in that both broadband signal reception and clear signal reception on a specific frequency are required and these two factors are opposing design factors.

Most existing adaptive or smart antennas use an array of fixed elements whose combined signal is controlled by an algorithm that determines proper values for the phase and gain of signals received at each element in the array. These antennas work in cellular towers for cell phone communications. Such antennas only have the ability to electrically modify the signal received by fixed elements in the array. These algorithms are designed to be used in specific antenna systems and the addition of variable length and variable positioning to these antennas would render the control algorithms for these antennas unusable.

What is needed is a system and method for efficiently optimizing positioning of receiving elements of a variable antenna. The needed system and method would be able to dynamically adapt in real time to the continually changing signal environments due to the environmental noise, system noise, severe weather conditions, interference with other signals, clutters, and terrain.

BRIEF SUMMARY OF THE INVENTION

It is an object of the present invention to provide a system and method for efficiently optimizing positioning of receiving elements of a variable antenna. More specifically, it is object of the present invention to provide an autonomous antenna system, which has the capability to self-optimize the reception of antenna signals. The system is able to optimize antenna element position, signal phase and signal strength from various antenna elements through the analysis of quality and strength of antenna signals by an artificial intelligence technique.

The present invention is generally drawn to a system and method for optimizing an antenna using a genetic algorithm (GA). The GA can be implemented as computer simulation in which a population of genomes of candidate solutions to an optimization problem evolves toward better solutions. The evolution usually starts from an initial population, which may be randomly generated individuals. In each generation, the fitness of every individual in the population is evaluated, multiple individuals may stochastically selected from the current population (based on their fitness), and modified (recombined and possibly mutated) to form a new population. The new population is then used in the next iteration of the algorithm. The algorithm terminates upon satisfaction of predetermined termination conditions, such as for example, when either a maximum number of generations has been produced, a predetermined computational time or energy has been spent, or a satisfactory fitness level has been reached for the population. If the algorithm has terminated due to a maximum number of generations, a satisfactory solution may or may not have been reached.

The fitness function of a genome measures the quality of the represented solution. Once a genetic representation and the fitness function are defined, the GA proceeds to initialize a population of solutions. The population size depends on the nature of the problem. The population may be generated randomly, covering the entire range of possible solutions (the search space). Occasionally, the solutions may be "seeded" in areas where optimal solutions are likely to be found. Then the population is improved through repetitive application of genetic operators such as selection, crossover, and mutation discussed below.

During each successive generation, a proportion of the existing population may be selected to breed a new generation. Individual genomes may be selected through a fitness-based process, where fitter solutions (as measured by a fitness function) may be more likely to be selected. Certain selection methods rate the fitness of each genome and preferentially select the best genomes. Other methods may rate only a random sample of the population, as this process may be very time-consuming.

The next step is to generate a second generation population of genomes from those selected through genetic operators of crossover and mutation. A crossover operator is when a string of bits in a genetic sequence from one parent genome is combined with a string of the remaining bits in a genetic sequence from another parent genome to create a child genome. A mutation operator involves changing at least one arbitrary bit in a genetic sequence of a "parent" genome from its initial state to create a "child" genome and to diversify solutions to unexplored area of the search space. By producing a child genome using the above methods of crossover and mutation, a new solution is created which typically shares many of the characteristics of its parents. The process continues until a new population of solutions of appropriate size is generated. For each new genome to be produced, a pair of parent genomes is selected for breeding from the pool selected previously.

These processes ultimately result in the next generation population of genomes that is different from the initial generation. Generally the average fitness will have increased by this procedure for the population, since only the best genomes from the first generation are selected for breeding. This generational process is repeated until a termination condition has been reached. Non-limiting termination conditions include: a genome that satisfies minimum criteria is found; a fixed number of generations are reached; an allocated budget of computation time/money has been reached; the highest ranking genome's fitness is reaching or has reached a plateau such that successive iterations no longer produce better results.

In one aspect of the invention, an apparatus comprises an antenna, a signal strength measuring circuit, a processing system and a servo controller. The antenna is operable to receive an electromagnetic signal and has at least one moveable, receiving element that is movable with at least one degree of freedom. The signal strength measuring circuit communicates with the antenna and is operable to provide a strength signal based on an electromagnetic signal received by the antenna. The processing system is operable to establish an initial population of states of the antenna. The initial population is an integer N greater than 1, and each of the plurality of states corresponds to respective positions of at least one moveable receiving element. The servo controller is operable to effectuate movement of one of at least one receiving element based on the servo instruction signals. The processing system is then operable to derive a servo instruction signal $x_i$ corresponding to an $i^{th}$ state of the antenna for each state i within the initial population and to output the $x_i$ servo instruction signal for each state i within the initial population. The servo controller is then operable to effectuate, based on the $x_i$ servo instruction signal, movement of one of at least one receiving element for each state i within the initial population. The antenna is operable to receive an electromagnetic signal for each state i within the initial population. The signal strength measuring circuit is operable to measure a signal strength for each electromagnetic signal for each state i within the initial population. The processing system is further operable to establish a fitness function corresponding to the signal strength for each measured electromagnetic signal for each state i within the initial population. The above-described process may repeat to generate new populations based on previous populations until a predetermined termination condition is satisfied.

An exemplary embodiment of the present invention includes a system having a rabbit ear style antenna for receiving television signals, a signal strength measuring device, and an analog-to-digital converter (ADC), a processing system, a servo controller, and servo elements for adjusting the positions of the antenna. To determine optimal positions of the azimuth of the pivoting base and the elevation for the servo elements, signal strength is measured to provide the fitness functions during the workings of an algorithm at different positions for the servos. The optimization algorithm used may include an artificial intelligence-based GA, which is one of the evolutionary computation techniques. The three angular positions of the servo, the elevations of the two elements and the azimuth of the base of the antenna can be encoded in individuals of the GA population. The algorithm runs on the processing system and acquires a fitness value for an individual of the GA population by updating the values in the servo controller, which then positions the antenna. The population improves through an evolutionary computational process using a fitness measure based on the signal strength. This fitness measure is the digital value of signal strength interpreted by the signal strength measuring circuit, converted to digital format by the ADC to provide discrete values to GA algorithm. At the end of the computation, the system positions the elements to the best position found by the GA. The signal strength is measured for a specific television channel, so that the final position is an optimal position obtained using only the desired frequencies of the desired television channel. Therefore, the final position gives exceptionally clear reception for a chosen channel. To change the servo positions for a new channel, the optimization process is repeated by running the GA again.

An antenna system in accordance with the present invention has many advantages over current antennas. An algorithm is used to determine optimized values for positions of antenna elements of a variable antenna. The algorithm may take into account environmental factors and other hindrances to signal reception without the need for intervention by the user. These factors may be taken into account because the fitness measure, for example the raw value of signal strength, used to optimize position already incorporates all interference and noise in the signal. Therefore, the system dynamically adapts in real time to continually changing signal environments due to the environmental noise, system noise, severe weather conditions, interference with other signals, clutters, and terrain. This control method also has the capability to handle far more complex systems than the variable antenna system described above.

This approach also adds computer control to the antenna system, which allows various control algorithms other than the exemplary GA disclosed herein. Other kinds of maximum finding algorithms such as hill climbing and simulated annealing may be used to attempt to find the best positioning for the antenna.

Using only the measured value of signal strength allows the antenna system to operate well in all environments in which it would be used.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an exemplary embodiment of the present invention and, together with the description, serve to explain the principles of the invention. In the drawings:

FIG. 4 illustrates an exemplary initial population of genomes for the antenna system of FIG. 1; and FIG. 5 illustrates an exemplary second-generation population of genomes for the antenna system of FIG. 1.

DETAILED DESCRIPTION OF THE INVENTION

Figure 1:
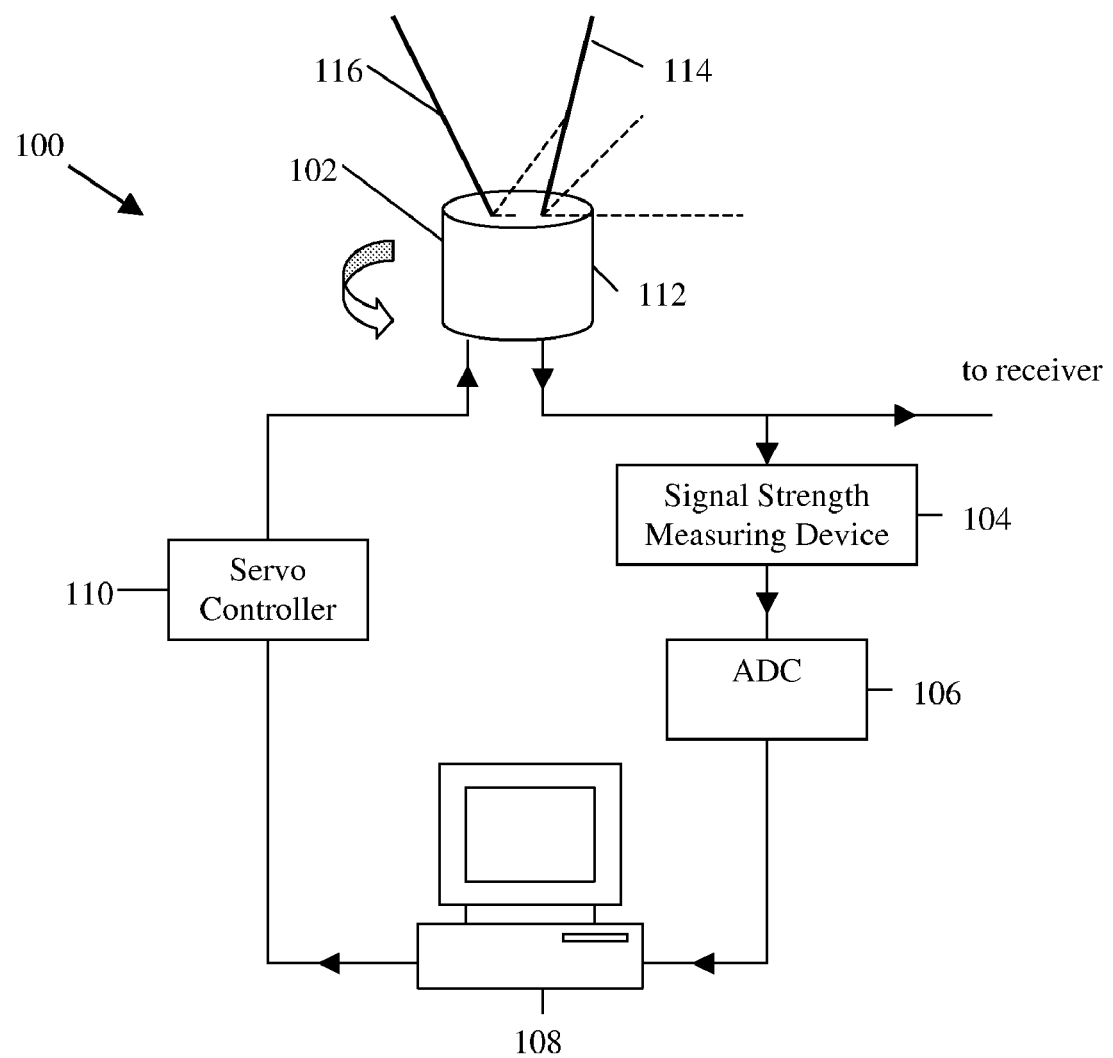
FIG. 1 illustrates an exemplary antenna system in accordance with the present invention.

FIG. 1 illustrates an exemplary antenna system in accordance with the present invention. In the figure, antenna system 100 includes antenna 102, signal strength measuring device 104, analog to digital converter (ADC) 106, processing system 108, and servo controller 110.

Antenna 102 includes base 112, first receiving element 114 and second receiving element 116. Base 112 is rotatable through angle w and thus has a single degree of freedom. First receiving element 114 has a first end that is moveably connected to base 112 and a second end. Specifically, first receiving element 114 is rotatable about its first end through an angle $\phi_1$ in a plane parallel to the top of base 112 and through an angle $\theta_1$ in a plane perpendicular to the top of base 112. As such, first receiving element 114 has two degrees of freedom. Second receiving element 116 has a first end that is moveably connected to base 112 and a second end. Specifically, second receiving element 116 is rotatable about its first end through an angle $\phi_2$ in a plane parallel to the top of base 112 and through an angle $\theta_2$ in a plane perpendicular to the top of base 112. As such, second receiving element 116 has two degrees of freedom.

Other embodiments of the antenna may include further degrees of freedom. Non-limiting examples of which include base 112 being rotatable about more than one axis and receiving elements 114 and 116 being telescopic in length. Further, other embodiments may include any variable antenna, non-limiting examples of which include variable conic section antennas, multiple element Uda-Yagi antennas and other multiple element antennas.

Antenna 102 is operable to receive an electromagnetic signal. In an exemplary embodiment the electromagnetic signal is a television signal. As discussed above, other embodiments may use different variable antennas, and as such, may receive different bands within the electromagnetic spectrum.

Once receiving elements 116 and 114 receive the electromagnetic signal, the signal is passed to both a receiver and to signal strength measuring device 104. In this example, as discussed above, the received signal is a TV signal. Therefore, the receiver in such a case is a TV receiver. Accordingly, if the signal is another type of signal, such as for example a RADAR signal, then the receiver would be a RADAR receiver.

Signal strength measuring device 104 measures a property of the signal. Non-limiting examples of measured properties include amplitude, phase, and frequency. In the present exemplary embodiment signal strength measuring device 104 measures the amplitude of the received signal.

ADC 106 receives an analog signal from signal strength measuring device 104 and sends a digital signal corresponding to the measured signal strength to processing system 108.

The angular positions of base 112, receiving element 114 and receiving element 116 are determined by operation of processing system 108 and servo controller 110. In general, an optimization algorithm executed by processing system 108 controls the positions of base 112, receiving element 114 and receiving element 116 by instructing servo controller 110 to control three servo motors to mover base 112, receiving element 114 and receiving element 116. This will be described in more detail below.

The exemplary system of FIG. 1 is represented as five distinct devices. However, the present invention is not limited to such an arrangement. The present invention may be implemented by less than five devices whose combined functions are operable to perform the functions of each of antenna 102, signal strength measuring device 104, ADC 106, processing system 108 and servo controller 110. Further, the present invention may be implemented by a single device whose functions are operable to perform the functions of each of antenna 102, signal strength measuring device 104, ADC 106, processing system 108 and servo controller 110. Still further, the present invention may be implemented by a device in communication with an antenna, wherein the device is operable to perform the functions of each of a signal strength measuring device 104, ADC 106, processing system 108 and servo controller 110. Still even further, the present invention may be implemented by a computer readable media for use with a computer in communication with an antenna, wherein the computer readable media has stored thereon, computer readable instructions capable of instructing a computer to perform the functions of each of a signal strength measuring device 104, ADC 106, processing system 108 and servo controller 110.

Figure 2:
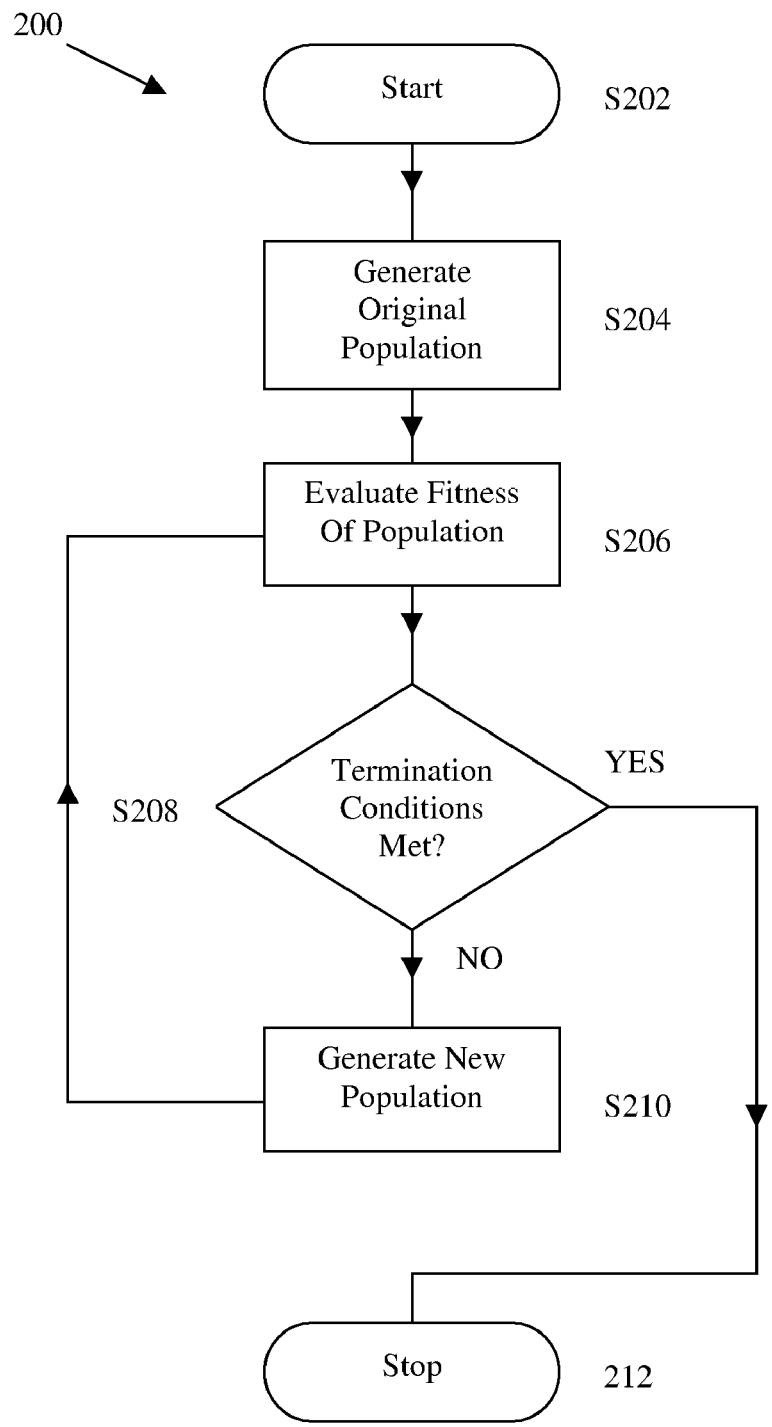
FIG. 2 is a flow diagram illustrating a GA in accordance with the present invention.

FIG. 2 is a flow diagram illustrating a GA in accordance with the present invention. Process 200 starts S202 and an initial population is generated S204. Non-limiting methods of generating the initial population include pseudo-random generation by an algorithm and even spacing of a population within a possible population domain. For example, in an exemplary embodiment wherein a base of a variable antenna is rotatable about a single axis, the possible population domain includes real numbers between 0 and $2\pi$ radians. An initial population may be chosen as 30 genomes spaced at $\pi/15$ starting at 0.

Figure 3:
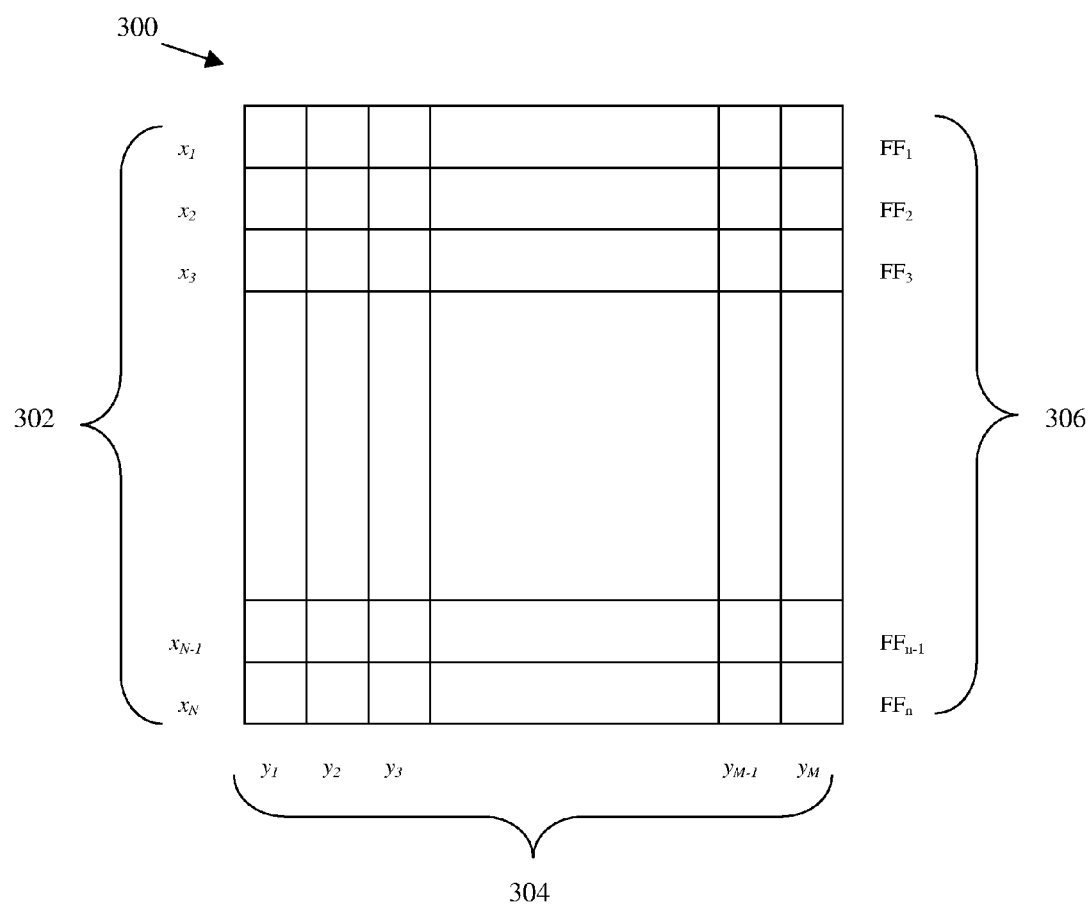
FIG. 3 is a graphical representation of a population of genomes.

FIG. 3 is a graphical representation of a population of genomes and may be used to generally describe an initial population. In the figure, the initial population may be represented by table 300, which includes a set 302 of rows $x_i$, wherein i extends from 1 though N and a set 304 of columns $y_j$, wherein j extends from 1 through M. Each of rows $x_i$ represents one genome, wherein all genomes make up the population. As applied to antenna 102 of FIG. 1, each genome represents a state of the antenna. Each of columns $y_j$ represents one aspect. The set 306 of items to the right of the population are respective fitness functions (FFs) for corresponding genomes.

FIG. 4 illustrates a hypothetical exemplary initial population of genomes for the antenna system of FIG. 1. Genomes 1-12 represent the 12 different states of antenna 102. Column $\phi_1$ represents the angle of first receiving element 114 in a plane parallel to the top of base 112, $\theta_1$ represents the angle of first receiving element 114 in a plane perpendicular to the top of base 112, $\phi_2$ represents the angle of second receiving element 116 in a plane parallel to the top of base 112, $\theta_2$ represents the angle of second receiving element 116 in a plane perpendicular to the top of base 112, and $\omega$ represents the angle of rotation of base 112. Column FF represents the corresponding fitness function of each genome.

Of course this population is merely hypothetical and exemplary in that more genomes may be used to increase the population. Further other degrees of freedom may be added, non-limiting examples of which include length of each receiving element, additional receiving elements and additional degrees of freedom for the base. Still further, different shapes, sizes and materials of antennas may be added as degrees of freedom.

Returning to FIG. 2, after the initial population is generated S204, the fitness of the population is evaluated S206. In the exemplary embodiment, the fitness function is based on the signal strength of the received signal as measured by signal strength measuring device 104, with 1.0 being the best reception. Therefore, as illustrated in FIG. 4, the parameters for $\phi_1$, $\theta_1$, $\phi_2$, $\theta_2$, and $\omega$ are used by processing system 108 to derive servo instruction signals to be sent to servo controller 110. After receiving the servo instruction signals, servo controller 110 sends control signals to servo motors to move base 112 to the specified angle $\omega$, to move first receiving element 114 an angle $\phi_1$ and an angle $\theta_1$, and to move second receiving element 116 an angle $\phi_2$ and an angle $\theta_2$. Once the antenna has been moved to the state specified by Genome 1 of FIG. 4 and receives a signal, signal strength measuring device 104 measures signal strength as 0.36. This process is repeated until all the fitness functions of the initial population are evaluated.

Once evaluated, it is determined whether predetermined termination conditions S208 are satisfied. Termination conditions are conditions that signal an end to the search for an optimal genome. Non-limiting examples of predetermined termination conditions include a minimum acceptable fitness function, a number of population searches, and total time of processing. In the present case, let the termination condition be a fitness function of 0.9. In other words, the system will continue to search for the optimal genome at least until a fitness function of 0.9 is found. In the case of FIG. 4, no genome has a fitness function of at least 0.9. Therefore, further genome searching is required. To do this, a new population should be created S210.

Although an entirely new population may be created, it will likely be more efficient to retain the best genomes of the initial population and generate a second population from the best genomes. The criteria used to determine "the best" genomes of a population may be predefined. Non-limiting examples of such criteria include a predetermined number X of the top fitness functions and the fitness functions above a predetermined value. In the exemplary embodiment illustrated in FIG. 4, assume that the criteria for determining "the best" includes choosing the four genomes having the best fitness functions.

It is clear that genomes 4, 5, 9 and 10 have the best fitness functions of the populations of fitness functions of FIG. 4. As such, these genomes will be used to generate a second population of genomes. FIG. 5 illustrates a hypothetical exemplary second generation population of genomes for the antenna system of FIG. 1, as derived from the population of FIG. 4. The population of FIG. 5 includes genomes 4, 5, 9 and 10 from the initial population of FIG. 4. The population of FIG. 5 additionally includes Genomes 4.2, 4.3, 5.2, 5.3, 9.2, 9.3, 10.2, and 10.3, which were created by genetic operators such as crossover and mutation.

Genomes 4.2, 5.2, 9.2, and 10.2 are genetic mutations of genomes 4, 5, 9, and 10, respectively. A genetic mutation is when at least one of the elements of the genome is changed. In the example of FIG. 5, genome 4 is identical to genome 4.2 with the exception of the angle $\phi_2$ being changed from 0 to $\pi/4$, genome 5 is identical to genome 5.2 with the exception of the angle $\omega$ being changed from $\pi/4$ to $3\pi/4$, genome 9 is identical to genome 9.2 with the exception of the angle $\phi_1$ being changed from $7\pi/4$ to $3\pi/2$, and genome 10 is identical to genome 10.2 with the exception of the angle $\phi_2$ being changed from $\pi$ to 0.

Genomes 4.3 and 5.3 are the result of genetic crossovers of genome 4 and genome 5. Specifically, genome 4.3 comprises the angles $\phi_1$ and $\theta_1$ of genome 5 and the angles $\phi_2$, $\theta_2$, and $\omega$ of genome 4. Similarly, genome 5.3 comprises the angles $\phi_1$ and $\theta_1$ of genome 4 and the angles $\phi_2$, $\theta_2$, and $\omega$ of genome 5.

Genomes 9.3 and 10.3 are the result of genetic crossovers of genome 9 and genome 10. Specifically, genome 9.3 comprises the angles $\phi_1$ and $\theta_1$ of genome 10 and the angles $\phi_2$, $\theta_2$, and $\omega$ of genome 9. Similarly, genome 10.3 comprises the angles $\phi_1$ and $\theta_1$ of genome 9 and the angles $\phi_2$, $\theta_2$, and $\omega$ of genome 10.

Returning to FIG. 2, now that the new population has been generated (S210), the fitness of the new population is evaluated. Just as before with respect to initial population (S204), the parameters for $\phi_1$, $\theta_1$, $\phi_2$, $\theta_2$, and $\omega$ are used by processing system 108 to derive servo instruction signals to be sent to servo controller 110. After receiving the servo instruction signals, servo controller 110 sends control signals to servo motors to move base 112 to the specified angle w, to move first receiving element 114 an angle $\phi_1$ and an angle $\theta_1$, and to move second receiving element 116 an angle $\phi_2$ and an angle $\theta_2$. Once the antenna has been moved to the state specified by Genome 4 of FIG. 5 and receives a signal, signal strength measuring device 104 measures signal strength as 0.8. This process is repeated until all the fitness functions of the new population are evaluated.

Similar to the initial population discussed above, once the new population is evaluated, it is determined whether predetermined termination conditions S208 are satisfied. As stated earlier, in the present case, the termination condition is a fitness function of 0.9. In the case of FIG. 5, genome 10.2 has a fitness function of 0.93, which is greater than the 0.9 fitness function termination condition. Therefore, no further genome searching is required.

Many similar antenna systems could be built using a setup similar to the one described here. The algorithm controlling the repositioning of the elements could be changed and replaced by other optimization algorithms such as simulated annealing or hill climbing algorithms. The algorithm could also be replaced with a formulaic method of describing position similar to control algorithms used in phased array antennas or current smart or adaptive antennas. The algorithm could also use measures other than signal strength as a fitness measure. Such measures could be used alone or in combination with the signal strength to find optimal positions for the antenna.

The variable antenna in the system could also be modified. The antenna could have more elements that can be either fixed or variable. The elements currently used could have added degrees of freedom. The computer in the system may be replaced by a specifically designed integrated circuit. Such a circuit would incorporate some or all of the elements of the control system, the computer, the measurement circuit, and the servo controller, into a single integrated circuit.

The foregoing description of various embodiments of the invention has been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus comprising,
an antenna operable to receive an electromagnetic signal and having at least one moveable receiving element that is movable with at least one degree of freedom;
a signal strength measuring circuit in communication with said antenna, said signal strength measuring circuit being operable to provide a strength signal based on an electromagnetic signal received by said antenna;
a processing system operable to establish an initial population of states of said antenna, to derive servo instruction signals and to output the servo instruction signals, each of the plurality of states corresponds to respective positions of said at least one moveable receiving element; and
a servo controller operable to effectuate movement of one of said at least one receiving element based on the servo instruction signals,
wherein the initial population is an integer N greater than 1,
wherein said processing system is operable to derive a servo instruction signal $x_i$ corresponding to a $i^{th}$ state of said antenna for each state i within the initial population and to output the $x_i$ servo instruction signal for each state i within the initial population,
wherein said servo controller is operable to effectuate, based on the $x_i$ servo instruction signal, movement of one of said at least one receiving element for each state i within the initial population,
wherein said antenna is operable to receive an electromagnetic signal for each state i within the initial population,
wherein said signal strength measuring circuit is operable to measure a signal strength for each electromagnetic signal for each state i within the initial population, and
wherein said processing system is further operable to establish a fitness function corresponding to the signal strength for each measured electromagnetic signal for each state i within the initial population.

2. The apparatus of claim 1, wherein said processing system is further operable to obtain acceptance criteria, to accept states of the initial population whose corresponding fitness functions meet the acceptance criteria and to generate a new population based on the accepted states.

3. The apparatus of claim 2,
wherein the new population is an integer M greater than 1,
wherein said processing system is operable to derive a servo instruction signal $x_j$ corresponding to a $j^{th}$ state of said antenna for each state j within the new population and to output the $x_j$ servo instruction signal for each state j within the new population,
wherein said servo controller is operable to effectuate, based on the $x_j$ servo instruction signal, movement of one of said at least one receiving element for each state j within the new population,
wherein said antenna is operable to receive an electromagnetic signal for each state j within the new population,
wherein said signal strength measuring circuit is operable to measure a signal strength for each electromagnetic signal for each state j within the new population, and
wherein said processing system is further operable to establish a fitness function corresponding to the signal strength for each measured electromagnetic signal for each state j within the new population.

4. The apparatus of claim 1, wherein said antenna comprises a base, a first receiving element and a second receiving element, said base being movable, said first receiving element being movably connected to said base, and said second receiving element being movably connected to said base.

5. The apparatus of claim 4,
wherein said base is rotatable and has one degree of freedom,
wherein said first receiving element has two degrees of freedom, and
wherein said second receiving element has two degrees of freedom.

6. The apparatus of claim 5,
wherein said base is rotatable about a first axis,
wherein said first receiving element comprises a first arm having a first end and a second end movably connected to said base, and
wherein said second receiving element comprises a second arm having a first end and a second end movably connected to said base.

7. The apparatus of claim 6,
wherein said first arm is pivotable about said second end of said first arm, and
wherein said second arm is pivotable about said second end of said second arm.

8. The apparatus of claim 6,
wherein said first arm is operable to change a distance between said first end of said first arm and said second end of said first arm, and
wherein said second arm is operable to change a distance between said first end of said second arm and said second end of said second arm.

9. An apparatus for use with an antenna operable to receive an electromagnetic signal and having at least one moveable receiving element that is movable with at least one degree of freedom, said apparatus comprising:
a signal strength measuring circuit in communication with the antenna, said signal strength measuring circuit being operable to provide a strength signal based on an electromagnetic signal received by the antenna;
a processing system operable to establish an initial population of states of the antenna, to derive servo instruction signals and to output the servo instruction signals, each of the plurality of states corresponds to respective positions of the at least one moveable receiving element; and
a servo controller operable to effectuate movement of one of the at least one receiving element based on the servo instruction signals,
wherein the initial population is an integer N greater than 1,
wherein said processing system is operable to derive a servo instruction signal $x_i$ corresponding to a $i^{th}$ state of the antenna for each state i within the initial population and to output the $x_i$ servo instruction signal for each state i within the initial population,
wherein said servo controller is operable to effectuate, based on the $x_i$ servo instruction signal, movement of one of the at least one receiving element for each state i within the initial population, wherein said signal strength measuring circuit is operable to measure a signal strength for each electromagnetic signal for each state i within the initial population, and wherein said processing system is further operable to establish a fitness function corresponding to the signal strength for each measured electromagnetic signal for each state i within the initial population.

10. The apparatus of claim 9, wherein said processing system is further operable to obtain acceptance criteria, to accept states of the initial population whose corresponding fitness functions meet the acceptance criteria and to generate a new population based on the accepted states.

11. The apparatus of claim 10, wherein the new population is an integer M greater than 1, wherein said processing system is operable to derive a servo instruction signal $x_j$ corresponding to a $j^{th}$ state of the antenna for each state j within the new population and to output the $x_j$ servo instruction signal for each state j within the new population, wherein said servo controller is operable to effectuate, based on the $x_j$ servo instruction signal, movement of one of the at least one receiving element for each state j within the new population, wherein said signal strength measuring circuit is operable to measure a signal strength for each electromagnetic signal for each state j within the new population, and wherein said processing system is further operable to establish a fitness function corresponding to the signal strength for each measured electromagnetic signal for each state j within the new population.

* * * * *